(12) United States Patent
Stevenson et al.

(10) Patent No.: US 7,695,227 B2
(45) Date of Patent: Apr. 13, 2010

(54) FASTENER FOR ATTACHMENT BY FRICTION STIR PROCESSING

(75) Inventors: Robin Stevenson, Bloomfield, MI (US); Pei-Chung Wang, Troy, MI (US); James F. Hengel, Romeo, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 657 days.

(21) Appl. No.: 11/469,995

(22) Filed: Sep. 5, 2006

(65) Prior Publication Data

US 2008/0056842 A1  Mar. 6, 2008

(51) Int. Cl.
*F16B 37/06* (2006.01)
*B23K 20/12* (2006.01)

(52) U.S. Cl. ............... 411/171; 411/82; 228/114.5
(58) Field of Classification Search ............ 411/82, 411/107, 171, 176, 179; 228/114.5
See application file for complete search history.

(56) References Cited

U.S. PATENT DOCUMENTS

| | | | | |
|---|---|---|---|---|
| 2,202,405 A | * | 5/1940 | Smith | 219/107 |
| 3,444,018 A | * | 5/1969 | Hewitt | 156/73.5 |
| 3,820,579 A | * | 6/1974 | Barry | 411/176 |
| 4,430,034 A | * | 2/1984 | Fujikawa | 411/179 |
| 4,915,558 A | * | 4/1990 | Muller | 411/179 |
| 5,199,837 A | * | 4/1993 | Goss | 411/107 |
| 6,238,121 B1 | * | 5/2001 | Roser | 403/13 |
| 6,454,891 B1 | * | 9/2002 | Goss | 156/73.5 |
| 6,485,240 B2 | * | 11/2002 | Stumpf et al. | 411/171 |
| 6,640,414 B2 | | 11/2003 | Stevenson et al. | 29/525.14 |
| 6,676,007 B2 | | 1/2004 | Stevenson | 228/112.1 |
| 6,702,535 B1 | | 3/2004 | Stevenson | 411/82 |
| 6,722,013 B1 | * | 4/2004 | Rapp | 29/521 |
| 6,729,531 B2 | | 5/2004 | Stevenson | 228/112.1 |
| 6,892,924 B2 | | 5/2005 | Stevenson | 228/2.1 |

* cited by examiner

*Primary Examiner*—Flemming Saether

(57) ABSTRACT

A fastener is provided for attachment to a workpiece by a friction stir process. The fastener includes a base having an underside adapted to seat upon the workpiece and a fastener portion attached to the top side of the base. An anchor portion projects from the underside of the base and is adapted to be rotated and advanced at high speed and inserted into the workpiece by friction stirring of the workpiece. The anchor portion is embedded in the workpiece upon cooling of the workpiece. The anchor portion has an indent in the surface thereof enabling the softened stirred material to flow into the indent and thereby mechanically capture the anchor portion within the solidified workpiece.

7 Claims, 4 Drawing Sheets

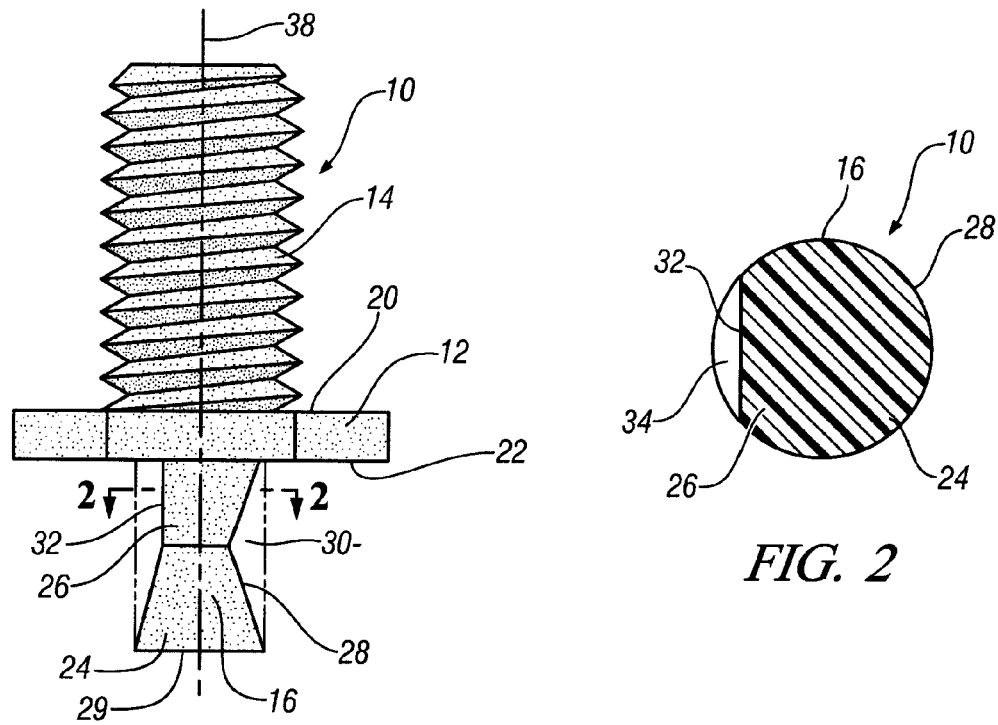
FIG. 1
FIG. 2
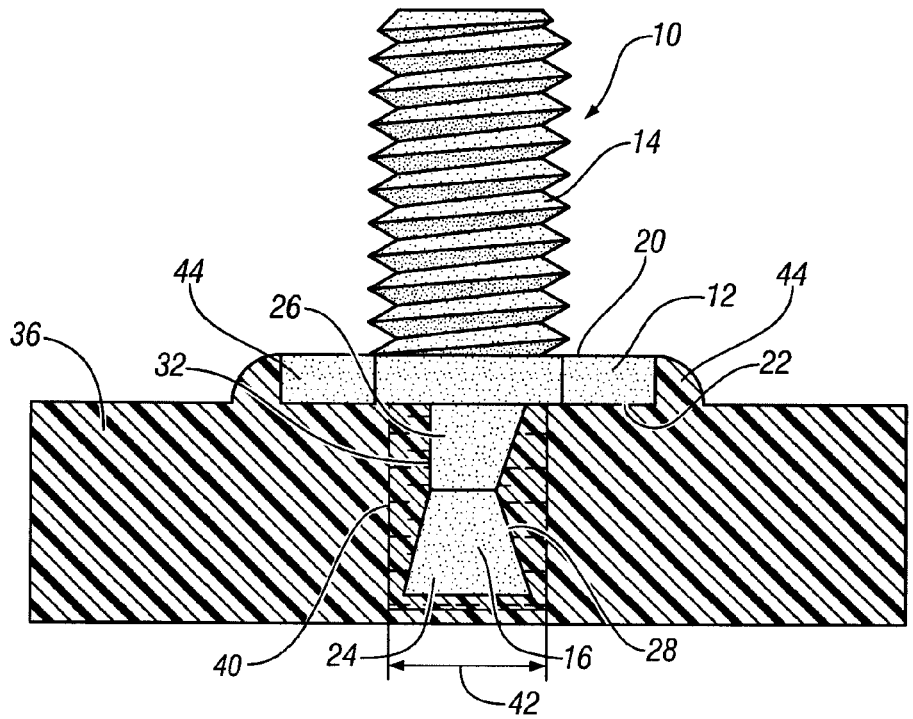
FIG. 3

FASTENER FOR ATTACHMENT BY FRICTION STIR PROCESSING

FIELD OF THE INVENTION

The present invention relates to attaching a fastener such as a screw or a nut to a work piece and more particularly provides a fastener that is embedded into a work piece by friction stir processing and is highly resistive to axial extraction and rotation relative to the work piece.

BACKGROUND OF THE INVENTION

It is known in the automotive industry and in other applications to attach a fastener onto a work piece. The fastener, such as a screw, a nut, a stud, etc., is most conventionally attached by resistance electric welding, and the fastener may have small projections that face toward the metal component so that the electric resistance heating is concentrated at these projections in order to facilitate the formation of the weld between the fastener and the metal component. Hence the process is often referred to as projection welding.

It has also known that a pair of work pieces, such as metal sheets, can be joined together by a friction stir rivet process in which a rivet is spun at high speed and advanced into the work pieces, thereby causing the a region of the work pieces surrounding the rivet to be plasticized and then, upon cooling, the rivet is captured within the cooled metal of the work pieces and thereby attaches the work pieces together. This friction stir riveting process is described in U.S. Pat. No. 6,702,535 assigned to the same assignee as this invention and herein incorporated by reference.

SUMMARY OF THE INVENTION

A fastener is provided for attachment to a workpiece by a friction stir process. The fastener includes a base having an underside adapted to seat upon the workpiece and a fastener portion attached to the top side of the base. An anchor portion projects from the underside of the base and is adapted to be rotated and advanced at high speed and inserted into the workpiece by friction stirring of the workpiece. The anchor portion is embedded in the workpiece upon cooling of the workpiece. The anchor portion has an indent in the surface thereof enabling the softened stirred material to flow into the indent and thereby mechanically capture the anchor portion within the solidified workpiece.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side elevation view of a fastener according to the invention;

FIG. 2 is a section view taken through the fastener of FIG. 1 in the direction of arrows 2-2 of FIG. 1;

FIG. 3 is a view similar to FIG. 1 but showing the fastener embedded into a component by friction stir welding;

DETAILED DESCRIPTION OF THE EXEMPLARY EMBODIMENTS

Figure 4:
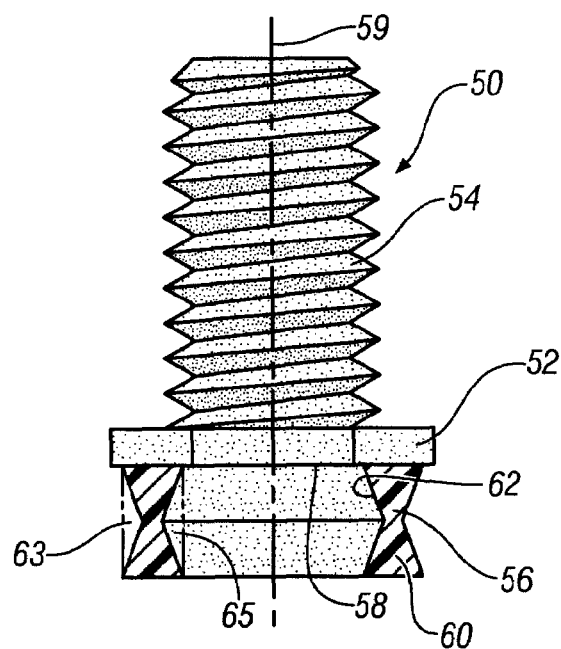
FIG. 4 shows a side elevation view of second embodiment of the invention.

The following description of certain embodiments is merely exemplary in nature and is not intended to limit the invention, its application, or uses.

Referring to FIG. 1, a fastener 10 is comprised of a base 12, a threaded stud 14, and an anchor 16. The base 12, threaded stud 14 and anchor 16 are preferably of one-piece manufacture, such as cold headed or machined, but may be two or more separate pieces that are joined together.

The base 12 is a hex shape to enable gripping by a hex socket. The threaded stud 14 rises from the top surface 20 of the base 12 and the anchor 16 projects downwardly from the bottom surface 22 of the base 12.

The anchor 16 is of a generally solid cylindrical shape, having a generally circular cross-section, of varying diameter to develop an enlarged diameter foot portion 24 and a smaller diameter waist portion 26. The enlarged foot portion 24 has a bottom foot surface 29. Thus as seen in FIG. 1, an indent region 30 is formed in what would otherwise be the right cylindrical shape of the anchor 16. Also some portion of the outer surface 28 of the anchor 16 has a flat portion 32 as is more clearly shown in FIG. 2, thereby forming an indent region 34 in what would otherwise be a circular cross-section of the small diameter portion.

Referring to FIG. 3, it is seen that the fastener 10 has been attached to a workpiece 36 by friction stir processing. In friction stir processing, the workpiece 36 is locked in a vise or otherwise held stationary, while the fastener 10 is locked in a chuck and rotated at high speed about its central axis 38 while being advanced toward engagement with the workpiece 36. The friction heating of the adjoining faces of the fastener 10 and the workpiece 36 cause softening of the workpiece 36. In FIG. 3 the friction stirred region within the workpiece is indicated at 40, it being understood that as the fastener 10 is rotated and advanced into the workpiece 36, the bottom foot surface 29 of enlarged diameter of the foot portion 24 will define the outermost diametrical reach, indicated at 42 of the stirred region. As the foot portion 24 passes deeper and deeper into the work piece 36, the softened metal of the work piece 36 is in the form of a right cylindrical well of softened material of the workpiece. As the foot portion 24 proceeds, the softened material will back fill around the smaller diameter waist portion 26 and against the flat portion 32, thus filling into the indents 30 and 34. During the final stages of insertion, the bottom surface 22 of the base 12 will act as a lid to force the softened metal of the workpiece 36 to back fill around the anchor 16, and then the excess material that is displaced by the volume of the anchor 16 is extruded outwardly to the outer diameter of the base 12 where it forms an annular ring of flash 44. This outward extrusion is facilitated by the friction heating of the material between the bottom surface 22 of the base 12 and the top surface of the workpiece 36.

As the metals cool and the workpiece material regains its original strength, the joint is obtained by the mechanical interference between the anchor 16 and the stirred region 40 of the workpiece 36. The attachment between the fastener 10 and the workpiece 36 is made strong by virtue of the mechanical interlock provided by the shape of the anchor portion 16. In particular, the deposit of solidified workpiece material into the indent 30 formed by the difference in diameter between the smaller diameter waist portion 26 and the enlarged diameter foot portion 24 causes the anchor portion 16 to be effectively embedded against extraction of the anchor 16 in the axial direction. Furthermore, the deposit of solidified workpiece material into the indent 34 formed by the flat wall 32 of the anchor portion 16 effectively locks the anchor portion 16 against rotation by torque applied to the fastener 10.

It will be understood that the softening of the workpiece and insertion of the anchor portion 16 is enabled by the material of the anchor portion 16 having a relatively higher metal point and/or hardness than the metal of the workpiece 36. Thus it is the material of the workpiece 36 that is subjected to fluid-like motion such that it may be displaced and induced to flow under the combined axial and rotary motion of the fastener 10 during the insertion process. Then upon cessation of stirring and the associated heat input, the softened material cools, increases in strength and firmly grips the fastener 10 to produce a high strength joint between fastener 10 and workpiece 36. Furthermore under some processing conditions the frictional heat developed may be sufficient to cause a softening of both the anchor portion 16 and workpiece 36 so that metallurgical bonding occurs, with the result that the fastener 10 is joined to the workpiece by the combined effect of both a mechanical embodiment of the anchor portion 16 and a metallurgical bond.

FIG. 4 shows another embodiment of the invention in which fastener 50 includes a base 52, threaded stud 54 that rises from the base 52 and an anchor ring 56 that projects downwardly from the underside 58 of the base 52. The anchor ring 56 is a hollow cylinder, annular in shape, and is symmetrical about a central axis 59. The anchor ring 56 has an enlarged foot portion 60 and a smaller waist portion 62, defining an outer annular indent region 63 and an annular inner indent region 65.

Figure 5:
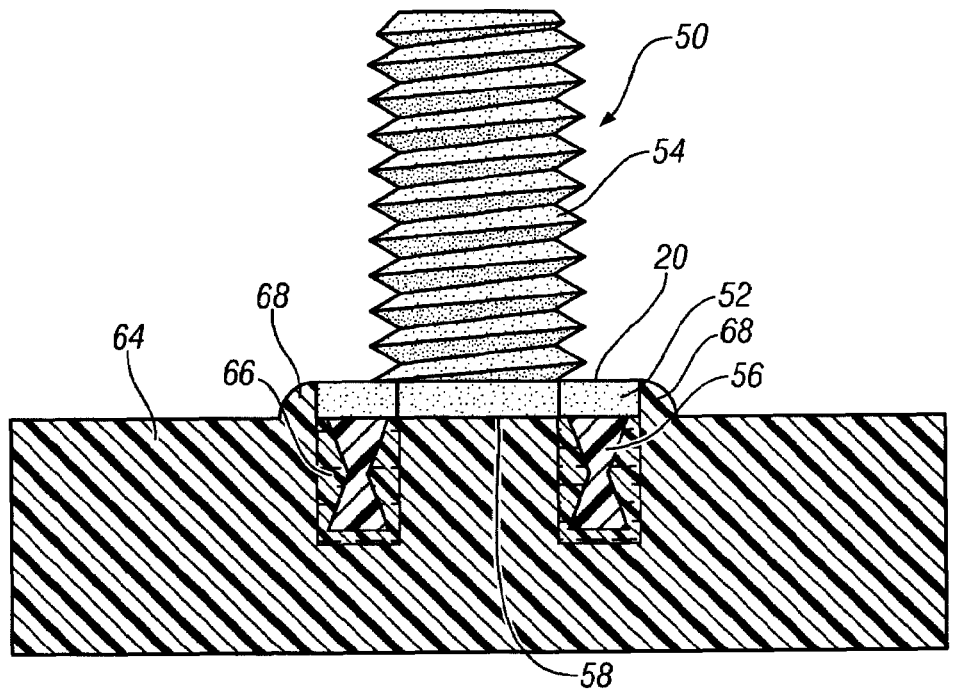
FIG. 5 shows the second embodiment of the invention embedded into a workpiece by friction stir welding.

Referring to FIG. 5, the fastener 50 is friction stir processed for attachment to a workpiece 64 by rotating the fastener 50 at a high speed and advancing the anchor ring 56 into the surface of the workpiece 64 to create a region 66 of stirred softened metal. Upon cooling, the anchor ring 56 is fixedly attached to the workpiece 64 through the mechanical interference resulting from the backfilling of the softened metal into the indents 63 and 65 defined by the smaller diameter waist portion 62. This locks the anchor ring 56 against axial extraction from the workpiece 64. Excess material that is displaced by the insertion of the anchor ring 56 is extruded from beneath the base 52 and forms a ring of flash 68 around the base 52. It will be understood that the fastener 50 does not have an indent in the cross section of the anchor ring 56. However, if desired, fastener 50 may be modified to provide improved resistance to rotational motion by adding a structural feature such as the flat 32 of FIG. 1, or by segmenting the anchor ring as will be discussed below in reference to FIG. 7.

Figure 6:
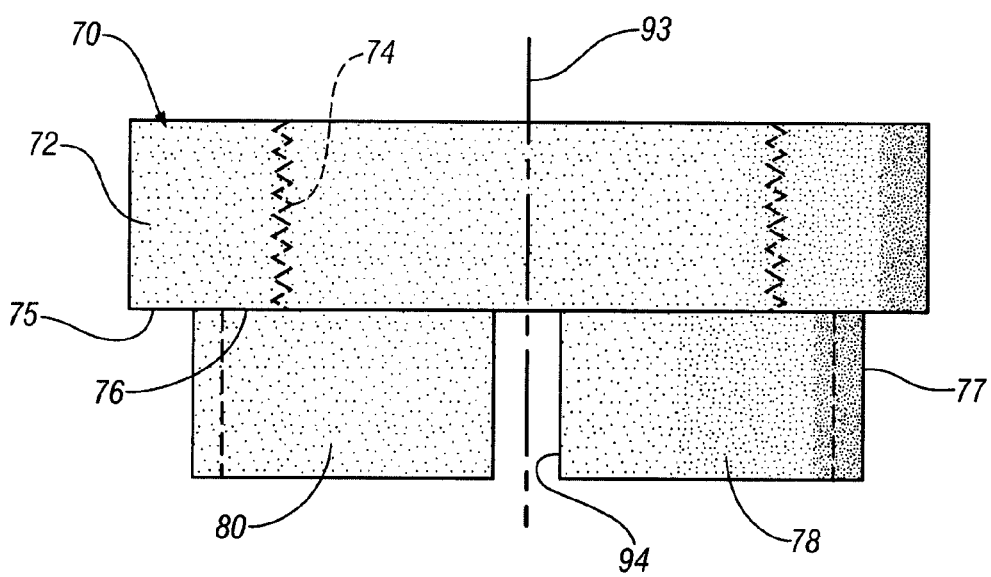
FIG. 6 shows a side elevation view of a third embodiment of the invention.
Figure 7:
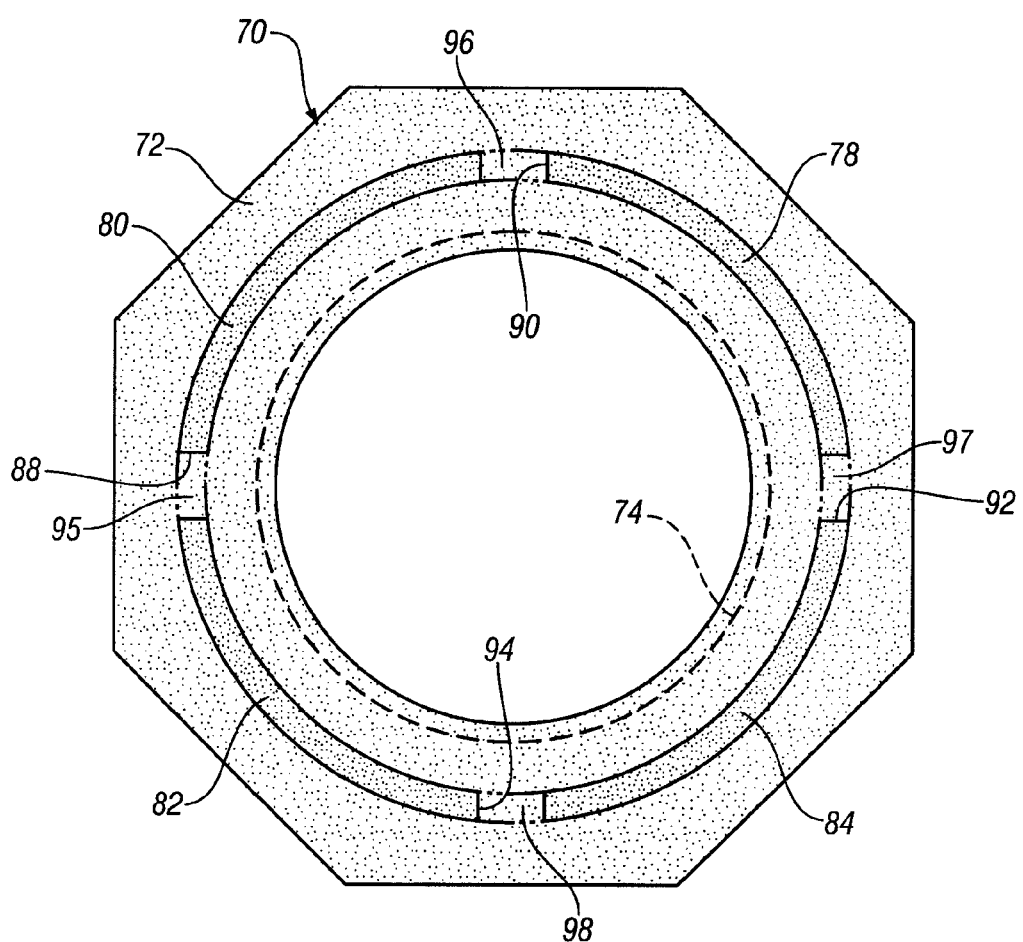
FIG. 7 shows a bottom view of the third embodiment of FIG. 6.

FIGS. 6 and 7 show another embodiment of the invention in which fastener 70 includes a nut 72 having an internally threaded hole 74 and an underside 75. The nut 72 provides a base 76. A hollow cylindrical structure 77 depends from the base 76 and includes four arcuate shaped anchor segments 78, 80, 82 and 84 that are separated from one another by voids 88, 90, 92 and 94 and are arrayed equidistant around the center axis 93 of the fastener 70. The voids 88, 90, 92 and 94 define indent regions 95, 96, 97, and 98. The fastener 70 will be rotated at high speed about center axis 93 and advanced toward a workpiece so that the anchor segments 78, 80, 82, and 84 will friction stir and soften the workpiece. The softened metal will backfill the indents 95, 96, 97 and 98. Upon cooling, the softened metal regains its initially hard state and the solidified material residing within the indents 95, 96, 97, and 98 thereby mechanically locks the fastener against rotation by torque forces applied upon the fastener 70. It will be understood that the fastener 70 does not have an indent in the axial profile of the anchor segments that would resist axial pull-out of the fastener 70 from the workpiece. However, if desired, the fastener 70 may be modified for resistance to axial pull-out by implementing the narrow-waisted cross section shown in FIG. 4 for the arcuate sections 78, 80, 82, and 84.

Figure 8:
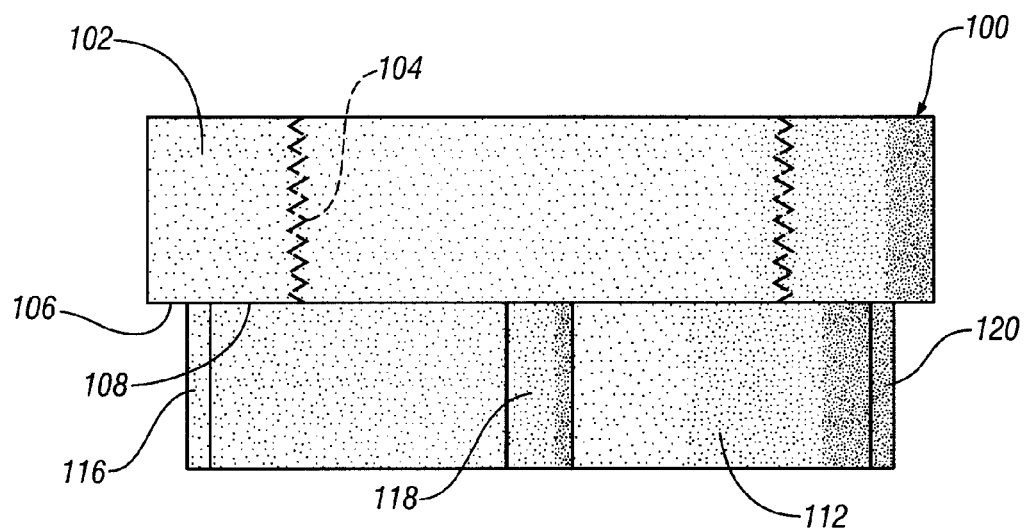
FIG. 8 shows a side elevation view of a fourth embodiment of the invention.
Figure 9:
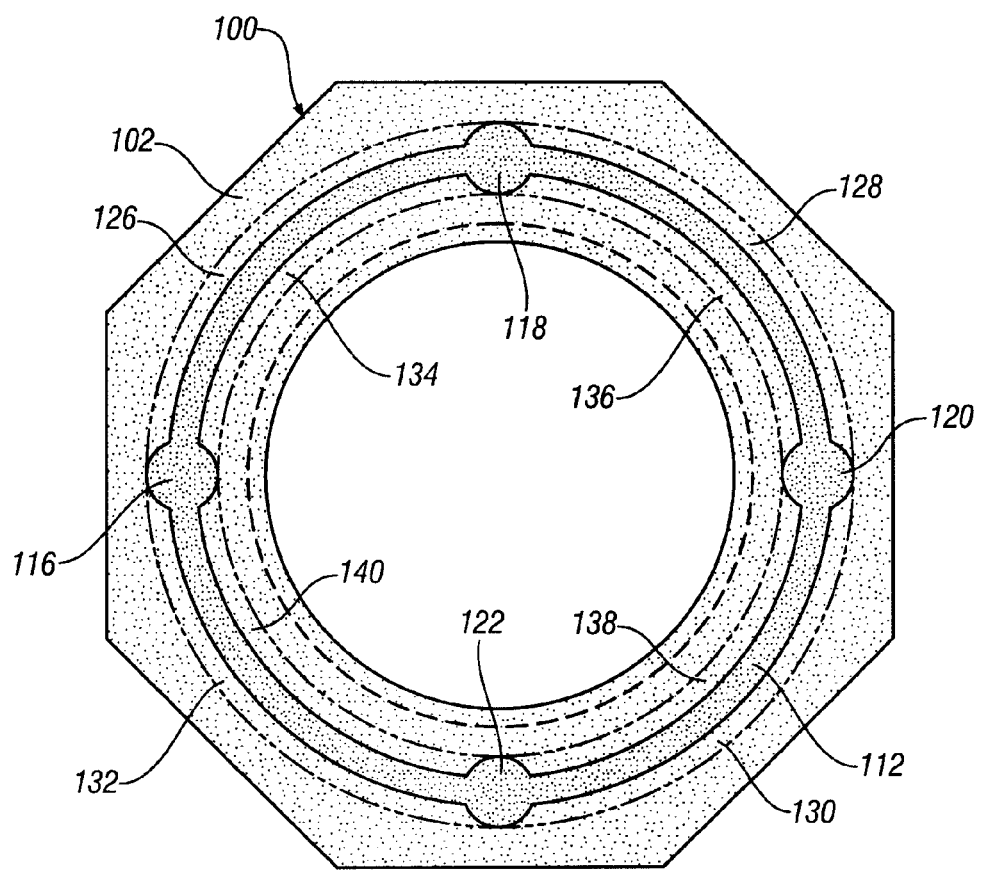
FIG. 9 shows a bottom view of the fourth embodiment of FIG. 8.

FIGS. 8 and 9 show yet another embodiment of the invention in which fastener 100 includes a nut 102 having an internally threaded hole 104 and an underside 106. The nut 102 provides a base 108 for a hollow cylinder shaped anchor ring 112 that projects downwardly from the underside 106. The anchor ring 112 has four enlarged pillar portions 116, 118, 120, and 122 that are arrayed equidistant around the periphery of the anchor ring 112. The fastener 100 will be rotated at high speed around its center axis and axially advanced toward a workpiece so that the anchor ring 112 will friction stir and soften the workpiece. The footprint of the softened region of workpiece material will be defined by the pillars 116, 118, 120 and 122 as it is the pillars that define the outermost and inner most reach of the anchor ring 112. Upon cooling, the molten metal hardens and the fastener 100 is mechanically locked against rotation by the solidified material that has backfilled into outer indent regions 126, 128, 130, and 132 defined between the pillars portions 116, 118, 120 and 122 on the outermost side of the anchor ring 112. In addition the solidified material back fills into inner indent regions 134, 136, 138, and 140 defined on the inner surface of the anchor ring 112 between the pillar portions 116, 118, 120 and 122. If desired, the anchor ring 112 may be modified to incorporate the narrow-waisted cross section of FIG. 4 to better resist axial pull-out of the fastener 100.

The foregoing description of the invention is merely exemplary in nature and, thus, variations thereof are intended to be within the scope of the invention. For example, the fastener may be a rivet, a nut, a threaded screw, or other type of conventional faster to which an anchor structure is attached for friction stir embodiment into a work piece. And, in view of the forgoing teachings, a person of skill in the art will appreciate a variety of structural shapes for the anchor portion that will provide for highly effective resistance to extraction and resistance to rotation of the fastener from its friction stir welded attachment to the work piece. And although the drawings show a metal workpiece, the workpiece may be a plastic material.

What is claimed is:

1. A threaded fastener for attachment to a workpiece by the friction stirring of a portion of the fastener into the workpiece, comprising:
   a base having an underside adapted to seat upon the workpiece, and a top side, said base having a hex shape to enable gripping by a hex socket for high speed rotation of the base;
   a threaded fastener portion attached to the top side of the base;
   an anchor ring of hollow cylindrical shape projecting from the underside of the base and adapted to be rotated and advanced at high speed and inserted into the workpiece upon friction stirring of the workpiece by the anchor ring, said anchor ring having an enlarged foot portion that is connected to the base by a narrow-waisted portion, thereby forming indented regions in which the friction stirred material of the workpiece becomes embedded to thereby anchor the anchor ring in the workpiece upon cooling of the workpiece.

2. The combination of a workpiece and a threaded fastener for attachment to the workpiece by the friction stirring of a portion of the fastener into the workpiece, comprising:

a base having an underside adapted to seat upon the workpiece, and a top side, said base having a hex shape to enable gripping by a hex socket for high speed rotation of the base as well as the flow of friction stirred workpiece material to form a ring of flash around the hex shaped base to mechanically capture the hex shaped base within the cooled workpiece, a threaded fastener portion attached to the top side of the base;

and an anchor portion projecting from the underside of the base and adapted to be rotated and advanced at high speed and inserted in-to the workpiece upon friction stirring of the workpiece by the anchor portion and to be embedded in the workpiece upon cooling of the workpiece, said anchor portion having at least one indent in the surface thereof enabling the softened stirred material to flow into the indent and thereby mechanically capture the anchor portion within the cooled workpiece.

3. The combination of claim 2 in which the fastener portion is a threaded stud.

4. The combination of claim 2 in which the fastener portion is a nut having internal threads.

5. A threaded fastener for attachment to a workpiece by the friction stirring of a portion of the fastener into the workpiece, comprising:

a base having an underside adapted to seat upon the workpiece, and a top side having a hex shape to enable gripping by a hex socket for high speed rotation of the base;

a threaded fastener portion attached to the top side of the base;

and an anchor portion projecting from the underside of the base and adapted to be rotated and advanced at high speed and inserted into the workpiece upon friction stirring of the workpiece by the anchor portion and to be embedded in the workpiece upon cooling of the workpiece, said anchor portion being a hollow circular cylinder ring having an enlarged foot portion that is connected to the base by a narrow-waisted portion forming both an outer annular indent region and an inner annular indent region in which the friction stirred material of the workpiece becomes embedded to thereby anchor the anchor ring in the workpiece.

6. The fastener of claim 5 in which the fastener portion is a threaded stud.

7. The fastener of claim in which the fastener portion is a nut having internal threads.

\* \* \* \* \*